C. H. KAY & C. F. HARTUNG.
SPRING CLIP FOR STORAGE BATTERIES.
APPLICATION FILED DEC. 11, 1917.
1,275,939.
Patented Aug. 13, 1918.
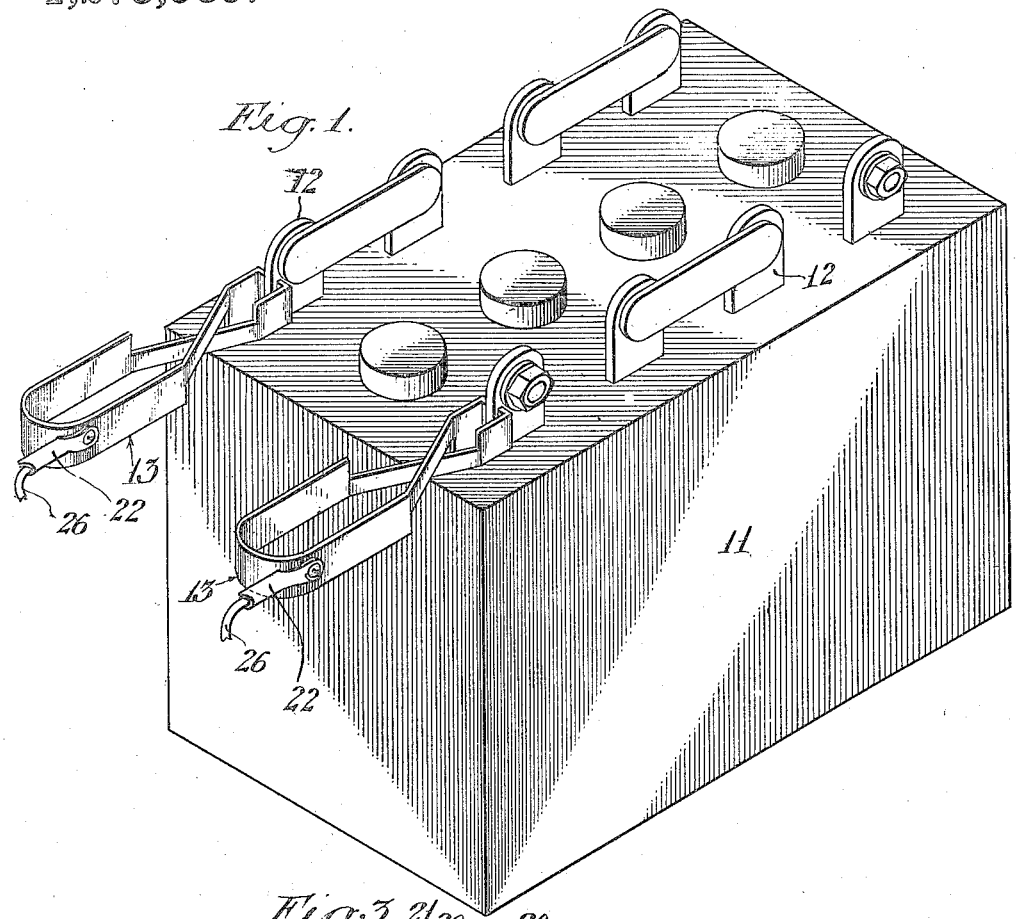
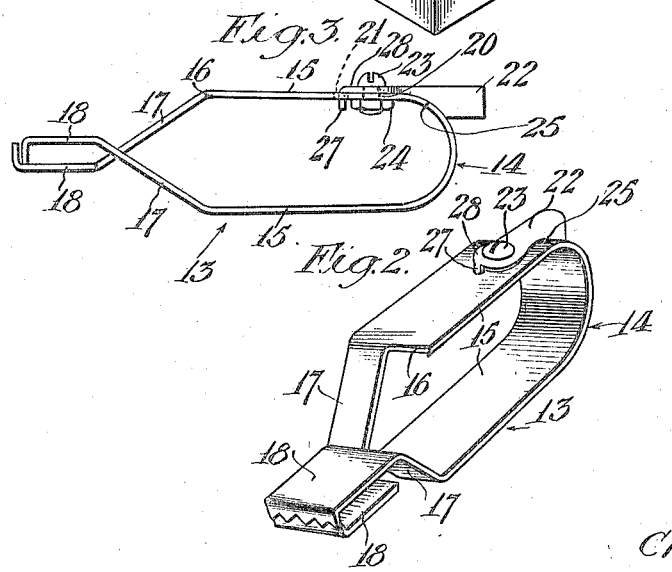
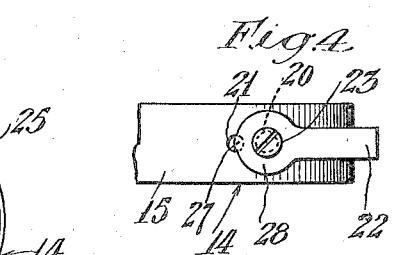
Inventors
Charles H. Kay
Charles F. Hartung
by Graham + Harris
Attorneys

UNITED STATES PATENT OFFICE.

CHARLES H. KAY, OF LOS ANGELES, AND CHARLES F. HARTUNG, OF ALHAMBRA, CALIFORNIA.

SPRING-CLIP FOR STORAGE BATTERIES.

1,275,939.

Specification of Letters Patent.

Patented Aug. 13, 1918.

Application filed December 11, 1917. Serial No. 206,707.

*To all whom it may concern:*

Be it known that we, CHARLES H. KAY and CHARLES F. HARTUNG, both citizens of the United States, the former residing at Los Angeles, in the county of Los Angeles and State of California, and the latter residing at Alhambra, in the county of Los Angeles and State of California, have invented a new and useful Spring-Clip for Storage Batteries, of which the following is a specification.

Our invention relates to the maintenance of storage batteries, and more particularly to means for quickly making temporary electrical connections thereto for the purpose of testing the same.

The invention consists in the novel combination and construction of parts illustrated in the drawing, described in the specification, and specified in the claim annexed hereto.

Referring to the drawings, which are for illustrative purposes only,

Figure 1 is a perspective view of our invention as applied to a storage battery.

Fig. 2 is a perspective view of the clip used in our invention.

Fig. 3 is a side elevation of this clip, and

Fig. 4 is a plan view of a portion of the clip showing the method of attaching the connector.

In the form of the invention shown in the drawings, a storage battery 11 is illustrated having lead terminals 12 projecting through the top thereof to which it is desired to affix clips 13. These clips consist of a single sheet of metal 14 which may be considered as divided into a spring portion 15 extending between the shoulders 16, extension arms 17 and clamping jaws 18. The metal member 14 is stamped from a single sheet of resilient metal which is then heavily coated with lead to render it immune from the acids used in storage batteries.

A large hole 20 and a small hole 21 are punched in the metal 14 before it is bent into the form shown and a connector 22 is secured therein by means of a screw 23 and a nut 24. The connector 22 is rounded as shown at 25 to suit the curvature of the clip 13 and is formed of a single sheet of metal turned up to form a cylindrical socket suited to receive a wire 26. A small projection 27 is formed on a concave eye 28 of the connector 22, this projection extending downwardly through the hole 21 so that the connector 22 cannot turn with relation to the clip 13.

The method of attaching the clip to the storage battery is obvious from the drawing, the spring members 15 being pressed inwardly thereby separating the jaws 18 which tend to close under spring tension whenever the pressure of the hand is released.

What we claim is:—

A spring clip for storage battery testing comprising a single sheet of metal punched out to form a spring portion, terminating at either end in an extension arm, each of said arms terminating in a clamping jaw, said sheet being then bent to place the jaws in cooperating relationship with each other; a connector formed of sheet metal bent to form a cylindrical socket adapted to receive a wire and having an eye with a central hole therein; a bolt and nut securing said eye to said sheet of metal; and a small projection formed on the outer edge of said eye opposite said socket and extending through an opening in said sheet so that said connector is prevented from turning with relation to said sheet.

In testimony whereof, we have hereunto set our hands at Los Angeles, California, this 3rd day of December, 1917.

CHARLES H. KAY.
CHARLES F. HARTUNG.